US011310696B2

(12) United States Patent
Tang (10) Patent No.: US 11,310,696 B2
(45) Date of Patent: Apr. 19, 2022

(54) METHOD FOR TRANSMITTING INFORMATION BY SELECTING TARGET UPLINK CARRIER, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/769,933

(22) PCT Filed: Dec. 8, 2017

(86) PCT No.: PCT/CN2017/115304
§ 371 (c)(1),
(2) Date: Jun. 4, 2020

(87) PCT Pub. No.: WO2019/109355
PCT Pub. Date: Jun. 13, 2019

(65) Prior Publication Data
US 2021/0204171 A1 Jul. 1, 2021

(51) Int. Cl.
*H04W 28/08* (2009.01)
*H04W 72/02* (2009.01)

(52) U.S. Cl.
CPC ....... *H04W 28/0858* (2020.05); *H04W 72/02* (2013.01)

(58) Field of Classification Search
CPC ... H04L 5/0091; H04L 5/0092; H04L 5/0098; H04W 48/10; H04W 48/12; H04W 72/02;
(Continued)

(56) References Cited

U.S. PATENT DOCUMENTS 9,264,918 B2 * 2/2016 Chun ................... H04J 11/0079
2008/0069033 A1 * 3/2008 Li .......................... H04W 48/16
370/328

(Continued)

FOREIGN PATENT DOCUMENTS

CN 1722640 1/2006
CN 101883398 11/2010
(Continued)

OTHER PUBLICATIONS

WIPO, ISR for PCT/CN2017/115304, May 30, 2018.
(Continued)

*Primary Examiner* — Kan Yuen
(74) *Attorney, Agent, or Firm* — Hodgson Russ LLP (57) ABSTRACT

A method for transmitting information, a terminal device and a network device are provided. The method includes: receiving, by a terminal device, a first value broadcast by a network device, the first value being configured for the terminal device to select a carrier; determining, by the terminal device, a target uplink carrier from a first uplink carrier and a second uplink carrier according to the first value, the first uplink carrier and the second uplink being configured for the terminal device to transmit data and having different frequencies; and sending, by the terminal device, uplink data to the network device over the target uplink carrier.

10 Claims, 3 Drawing Sheets

(58) Field of Classification Search
CPC ............... H04W 72/04; H04W 72/042; H04W 72/0453; H04W 72/0486; H04W 72/1252; H04W 72/1289
See application file for complete search history.

(56) References Cited

U.S. PATENT DOCUMENTS

| | | | | |
|---|---|---|---|---|
| 2013/0077485 | A1* | 3/2013 | Bai | H04W 74/085 370/230 |
| 2013/0267230 | A1* | 10/2013 | Lin | H04W 24/02 455/436 |
| 2016/0127969 | A1* | 5/2016 | Pao | H04W 36/22 455/437 |
| 2016/0143035 | A1 | 5/2016 | Xue et al. | |
| 2018/0084550 | A1* | 3/2018 | Chen | H04W 76/15 |
| 2018/0310321 | A1* | 10/2018 | Basu Mallick | H04W 72/085 |
| 2020/0178333 | A1* | 6/2020 | Liu | H04W 92/20 |

FOREIGN PATENT DOCUMENTS

| | | |
|---|---|---|
| CN | 103037441 | 4/2013 |
| CN | 105577338 | 5/2016 |
| JP | 2011519204 | 6/2011 |
| WO | 2012095180 | 7/2012 |

OTHER PUBLICATIONS

CMCC, "Discussion on SUL and UL sharing band definition," 3GPP TSG-RAN WG4 Meeting NR#2, R4-1706706, May 2017, 6 pages.
Samsung, "Connected mode aspects of supplementary uplink frequency," 3GPP TSG-RAN WG2 #99bis, R2-1711808, Oct. 2017, 4 pages.
LG Electronics Inc et al., "Correction to maximum number of HARQ processes for NB-IoT," 3GPP TSG-RAN WG2 Meeting #98, R2-1704492, May 2017, 14 pages.
Interdigital Inc., "Random Access procedure on SUL," 3GPP TSG-RAN WG2 #100, R2-1712783, Nov. 2017, 6 pages.
Ericsson, "Introduction of ESAB," 3GPP TSG RAN WG6 #4, R6-170257 (Revision of R6-170160), May 2017, 13 pages.
Huawei et al., "Considerations of NR UL operation," 3GPP TSG RAN WG1 Meeting #88, R1-1701668, Feb. 2017, 5 pages.
EPO, Partial Supplementary European Search Report for EP Application No. 17934196.1, dated Nov. 2, 2020.
EPO, Extended European Search Report for EP Application No. 17934196.1, dated Feb. 2, 2021.
IPI, Office Action for IN Application No. 202017026009, dated Jun. 29, 2021.
JPO, Notice of Reasons for Refusal issued for JP Patent Application No. 2020-531064, dated Nov. 10, 2021.

* cited by examiner

METHOD FOR TRANSMITTING INFORMATION BY SELECTING TARGET UPLINK CARRIER, TERMINAL DEVICE, AND NETWORK DEVICE

CROSS-REFERENCE TO RELATED APPLICATIONS

The present application is a U.S. national phase entry of International Application No. PCT/CN2017/115304, filed on Dec. 8, 2017, the entire disclosure of which is hereby incorporated by reference.

TECHNICAL FIELD

Embodiments of the present disclosure relate to the field of communication, and more specifically, to a method for transmitting information, a terminal device and a network device.

BACKGROUND

Because of requirements of speed, latency, high-speed mobility and energy efficiency, and diversity and complexity of services in future life, the 3rd Generation Partnership Project (3GPP) International Standard Organization started to develop the Fifth Generation Mobile Communication Technology (5-Generation, 5G). During early deployment of New Radio (NR), it is difficult to have a complete NR coverage, so a typical network coverage is wide-area long-term evolution (LTE) coverage and NR island coverage. Since a large amount of LTE is deployed below 6 GHz (GHz), there are very few frequency spectrums below 6 GHz available for 5G. Therefore, as for the NR, it must study spectrum applications above 6 GHz. However, the coverage at high frequency bands is limited and signal attenuation at high frequency bands is fast.

In the prior art, since uplink power of a terminal device is limited, and the NR spectrum (a primary uplink carrier) has a high frequency and a high propagation loss, the uplink coverage is limited. In order to increase the uplink coverage, the LTE spectrum (with a frequency relatively low) is used as a secondary uplink spectrum, i.e., there is a secondary uplink carrier that can improve the uplink coverage.

More specifically, if Reference Signal Receiving Power (RSRP) in a measured cell is lower than a threshold configured and broadcast by a system, the secondary uplink carrier is selected to further improve the uplink coverage. If the RSRP measured by the terminal device is higher than the threshold configured and broadcast by the system, the terminal device may select the primary uplink carrier or the secondary uplink carrier.

However, loads on the two carriers are different.

Therefore, if the terminal device cannot reasonably select a carrier from the two carries to transmit data, uplink capacity may be limited.

SUMMARY

In a first aspect, the present disclosure may be embodied as a method for transmitting information, including: receiving, by a terminal device, a first value broadcast by a network device, the first value being configured for the terminal device to select a carrier; determining, by the terminal device, a target uplink carrier from a first uplink carrier and a second uplink carrier according to the first value, the first uplink carrier and the second uplink carrier being configured for the terminal device to transmit data and having different frequencies from each other; and sending, by the terminal device, uplink data to the network device over the target uplink carrier.

In some embodiments, the method further includes, before determining the target uplink carrier: obtaining, by the terminal device, a second value, the second value being configured to be compared with the first value, and a comparison result between the first value and the second value indicating that the target uplink carrier is the first uplink carrier or the second uplink carrier. The determining the target uplink carrier includes: determining, by the terminal device, the target uplink carrier according to the comparison result.

In some embodiments, obtaining, by the terminal device, a second value includes: randomly generating, by the terminal device, the second value.

In some embodiments, obtaining, by the terminal device, a second value includes: receiving, by the terminal device, the second value sent by the network device, wherein the second value is determined by the network device according to a load condition of the first uplink carrier and the load condition of the second uplink carrier.

In some embodiments, when a load of the first uplink carrier is less than the load of the second uplink carrier, the second value is greater than a third value; and when the load of the first uplink carrier is greater than or equal to the load of the second uplink carrier, the second value is less than or equal to the third value, wherein the third value is a base value used by the network device to determine the second value.

In some embodiments, when a load of the first uplink carrier is greater than or equal to the load of the second uplink carrier, the second value is greater than a third value; and when the load of the first uplink carrier is less than the load of the second uplink carrier, the second value is less than or equal to the third value, wherein the third value is a base value used by the network device to determine the second value.

In some embodiments, when the comparison result is that the first value is greater than the second value, the comparison result indicates that the target uplink carrier is the first uplink carrier; or when the comparison result is that the first value is less than or equal to the second value, the comparison result indicates that the target uplink carrier is the second uplink carrier.

In some embodiments, each of the first value, the second value and the third value has a value range of 0 to 1; or each of the first value, the second value and the third value has the value range of 0 to 10.

In some embodiments, a signal measurement quality of the terminal device is greater than a threshold value broadcast by a system.

In a second aspect, the present disclosure may be embodied as a method for transmitting information, including: determining, by a network device, a first value, the first value being configured for a terminal device to determine a target uplink carrier from a first uplink carrier and a second uplink carrier, and the first uplink carrier and the second uplink carrier being configured for the terminal device to transmit data and having different frequencies; and sending, by the network device, the first value to the terminal device in a broadcast manner.

In some embodiments, the method further includes: determining, by the network device, a second value according to a load condition of the first uplink carrier and the load condition of the second uplink carrier, so that the terminal device determines the target uplink carrier from the first uplink carrier and the second uplink carrier by comparing the first value and the second value; and sending, by the network device, the second value to the terminal device.

In some embodiments, when a load of the first uplink carrier is less than the load of the second uplink carrier, the second value is greater than a third value; and when the load of the first uplink carrier is greater than or equal to the load of the second uplink carrier, the second value is less than or equal to the third value, wherein the third value is a base value used by the network device to determine the second value.

In some embodiments, when a load of the first uplink carrier is greater than or equal to the load of the second uplink carrier, the second value is greater than a third value; and when the load of the first uplink carrier is less than the load of the second uplink carrier, the second value is less than or equal to the third value, wherein the third value is a base value used by the network device to determine the second value.

In some embodiments, each of the first value, the second value and the third value has a value range of 0 to 1; or each of the first value, the second value and the third value has the value range of 0 to 10.

In some embodiments, a signal measurement quality of the terminal device is greater than a threshold value broadcast by a system.

In a third aspect, the present disclosure may be embodied as a terminal device, including: a transmitting-receiving unit, configured to receive a first value broadcast by a network device, the first value being configured for the terminal device to select a carrier; and a processing unit, configured to determine, a target uplink carrier from a first uplink carrier and a second uplink carrier according to the first value, the first uplink carrier and the second uplink carrier being configured for the terminal device to transmit data and having different frequencies. The transmitting-receiving unit is further configured to send uplink data to the network device over the target uplink carrier.

In a fourth aspect, the present disclosure may be embodied as a network device, including: a determining unit, configured to determine a first value, the first value being configured for a terminal device to determine a target uplink carrier from a first uplink carrier and a second uplink carrier, and the first uplink carrier and the second uplink carrier being configured for the terminal device to transmit data and having different frequencies; and a transmitting-receiving unit, configured to send the first value to the terminal device in a broadcast manner.

In a fifth aspect, the present disclosure may be embodied as a terminal device, including: a transceiver, configured to receive a first value broadcast by a network device, the first value being configured for the terminal device to select a carrier; and a processor, configured to determine, a target uplink carrier from a first uplink carrier and a second uplink carrier according to the first value, the first uplink carrier and the second uplink carrier being configured for the terminal device to transmit data and having different frequencies. The transmitting-receiving unit is further configured to send uplink data to the network device over the target uplink carrier.

In a sixth aspect, the present disclosure may be embodied as a network device, including: a processor, configured to determine a first value, the first value being configured for a terminal device to determine a target uplink carrier from a first uplink carrier and a second uplink carrier, and the first uplink carrier and the second uplink carrier being configured for the terminal device to transmit data and having different frequencies; and a transceiver, configured to send the first value to the terminal device in a broadcast manner.

In a seventh aspect, the present disclosure may be embodied as a computer-readable medium, having computer programs stored thereon. The computer programs include instructions for implementing the method embodiments according to the above first aspect or second aspect.

In an eighth aspect, the present disclosure may be embodied as a computer chip, including: an input interface, an output interface, at least one processor and a memory. The processor is configured to execute codes in the memory, and when executing the codes, the processor can implement each of processes performed by the network device in the method embodiments of the above first aspect and various implementations.

In a ninth aspect, the present disclosure may be embodied as a computer chip, including: an input interface, an output interface, at least one processor and a memory. The processor is configured to execute codes in the memory, and when executing the codes, the processor can implement each of processes performed by the terminal device in the method embodiments of the above first aspect and various implementations.

In a tenth aspect, the present disclosure may be embodied as a communication system, including the network device and terminal device described above.

DETAILED DESCRIPTION

Figure 1:
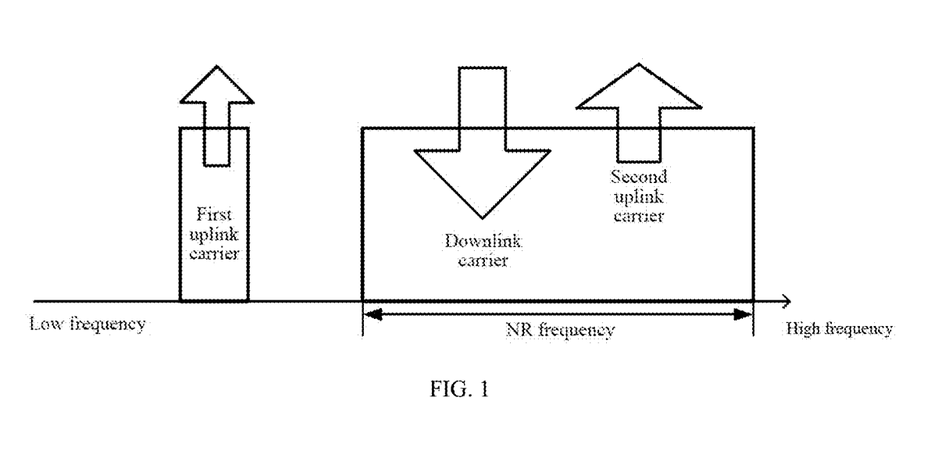
FIG. 1 is an example of an application scenario of the present disclosure.

FIG. 1 is an example of an application scenario of an embodiment of the present disclosure.

As shown in FIG. 1, a terminal device may have one downlink carrier and two uplink carriers (as shown in FIG. 1, a first uplink carrier and a second uplink carrier). Specifically, the first uplink carrier and the downlink carrier may be carriers on an NR high-frequency band, and the second uplink carrier may be a carrier on an LTE low-frequency band. It should be understood that the terminal device shown in FIG. 1 having two uplink carriers is only an exemplary description, which is not specifically limited in the embodiment of the present disclosure. For example, the terminal device may also support three uplink carriers and so on.

It can be understood that the arrangement of the second uplink carrier is to improve an uplink coverage of the NR high frequency band.

Specifically, since uplink power of the terminal device is limited and the frequency of NR spectrum (with high frequency and high propagation loss) is high, the uplink coverage of the NR will be limited. In order to improve the uplink coverage, an embodiment of the present disclosure provides a method for transmitting data. An uplink coverage effect can be increased by using the LTE spectrum (with relatively low frequency) as a secondary uplink carrier.

For example, the combination of the first uplink carrier and the second uplink carrier may be similar to carrier aggregation (CA) in LTE, except that there is no paired downlink. That is, from the perspective of band combination, the second uplink carrier is a cell with only uplink and no paired downlink, but the uplink thereof is controlled by a certain downlink carrier. That is, when the second uplink carrier is configured, the second uplink carrier is a secondary serving cell (SCell) without downlink. The control of the second uplink carrier depends on a primary serving cell (PCell).

It should be understood that embodiments of the present disclosure may be applied to any communication system including a plurality of uplinks. For example, the first communication system and the second communication system may be various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Time Division Duplex (TDD) system, a Universal Mobile Telecommunication System (UMTS), etc.

In addition, the present disclosure describes various embodiments with reference to a network device (the first network device to the fourth network device) and a terminal device.

The network device may refer to any entity used to send or receive signals at network side. For example, it can be user equipment of machine type communication (MTC), a Base Transceiver Station (BTS) in GSM or CDMA, a NodeB in WCDMA, an Evolutionary Node B (eNB or eNodeB)), a base station in 5G networks, etc.

The terminal device may be any terminal device. Specifically, the terminal device can communicate with one or more core networks through a radio access network (RAN), and may also be referred to as an access terminal, user equipment (UE), a user unit, a user station, a mobile radio station, a mobile station, a remote station, a remote terminal, a mobile device, a user terminal, a terminal, a wireless communication device, a user agent, or a user device. For example, it may be a cellular phone, a cordless phone, a Session Initiation Protocol (SIP) phone, a Wireless Local Loop (WLL) station, a Personal Digital Assistant (PDA), a handheld devices with a wireless communication function, a computing device, or other processing devices connected to a wireless modem, an in-vehicle devices, a wearable device, a terminal devices in 5G network and the like.

However, for the above scenario shown in FIG. 1, the selection of the second uplink carrier (a secondary carrier) is determined based on signal quality of the downlink carrier measured by the terminal device. For example, if a Reference Signal Receiving Power (RSRP) of a measured cell is lower than a threshold configured and broadcast by a system, the secondary uplink carrier is selected to further increase uplink coverage. If the RSRP measured by the terminal device is higher than the threshold configured and broadcast by the system, the terminal device may select a primary uplink carrier or the secondary uplink carrier.

However, since loads on the two carriers are different, the terminal device needs to select a carrier from the two carriers to transmit data, thereby increasing an uplink capacity.

In order to solve the above technical problem, an embodiment of the present disclosure provides a method for transmitting data, so that a terminal device may select a carrier from a plurality of carriers to transmit data, and thus loads of the plurality of uplink carriers of the terminal device for transmitting data are balanced, thereby increasing an uplink capacity.

Figure 2:
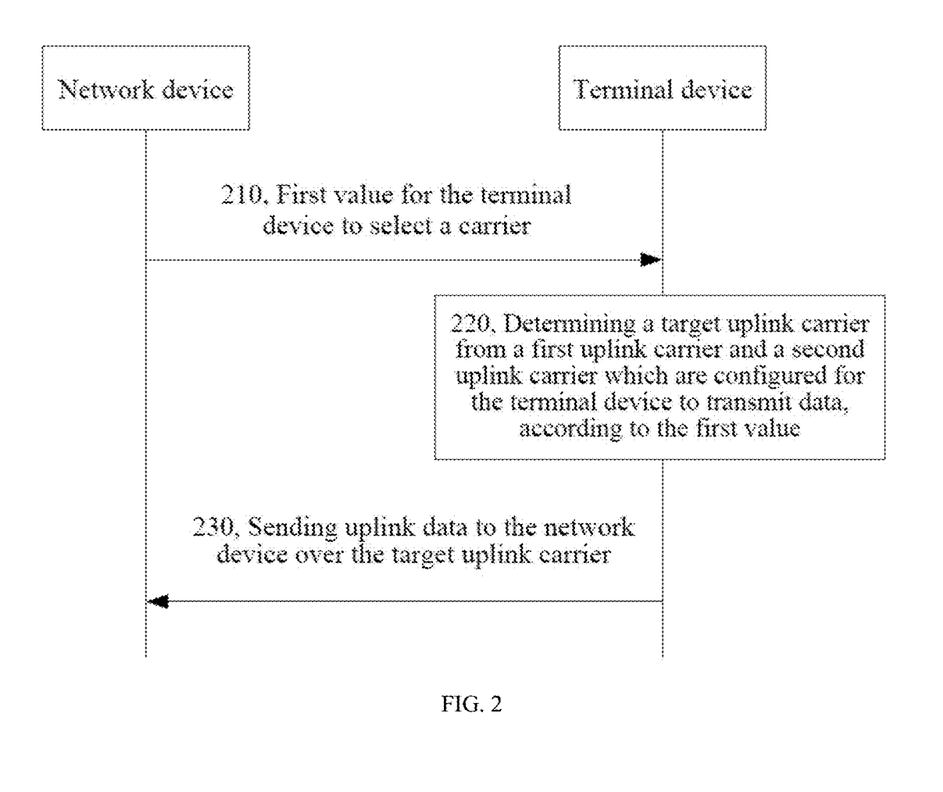
FIG. 2 is a schematic flowchart of a method for transmitting information according to an embodiment of the present disclosure.

FIG. 2 is a schematic flowchart of a method for transmitting information according to an embodiment of the present disclosure.

Specifically, as shown in FIG. 2, the method includes steps 210 to 230.

In step 210, a terminal device receives a first value sent by a network device, wherein the first value is configured for the terminal device to select a carrier. For example, the terminal device receives the first value broadcast by the network device for the terminal device to select the carrier. That is, the first value is transmitted to the terminal device in a broadcast form.

In step 220, the terminal device determines a target uplink carrier from a first uplink carrier and a second uplink carrier according to the first value, wherein the first uplink carrier and the second uplink carrier are configured for the terminal device to transmit data.

In step 230, the terminal device sends uplink data to the network device over the target uplink carrier.

In short, the terminal device determines the uplink carrier for transmitting data by using the first value from the network device. That is, in the method according to the embodiment of the present disclosure, the network device can control the terminal device to select a carrier from a plurality of carriers to transmit data, and thus loads of the plurality of uplink carriers of the terminal device for transmitting data are balanced, thereby increasing an uplink capacity.

It should be understood that in an embodiment of the present disclosure, a signal measurement quality of the terminal device may be greater than a threshold value broadcast by a system. Further, the signal measurement quality may be a Reference Signal Receiving Power (RSRP) and/or a Reference Signal Receiving Quality (RSRQ) measured by the terminal device.

For example, the first value may directly indicate an uplink carrier used by the terminal device to transmit uplink data. That is, the first value may be an index of the target uplink carrier.

In an embodiment, before determining the target uplink carrier, the terminal device may further obtain a second value. The second value is configured to be compared with the first value, and a comparison result between the first value and the second value indicates that the target uplink carrier is the first uplink carrier or the second uplink carrier. Further, the terminal device may determine the target uplink carrier according to the above comparison result.

In an embodiment, the terminal device randomly generates the second value.

In another embodiment, the terminal device receives the second value sent by the network device. The second value is determined by the network device according to a load condition of the first uplink carrier and the load condition of the second uplink carrier.

For example, if a load of the first uplink carrier is less than the load of the second uplink carrier, the second value is greater than a third value; and if the load of the first uplink carrier is greater than or equal to the load of the second uplink carrier, the second value is less than or equal to the third value. The third value is a base value used by the network device to determine the second value.

For example, if a load of the first uplink carrier is greater than or equal to the load of the second uplink carrier, the second value is greater than a third value; and if the load of the first uplink carrier is less than the load of the second uplink carrier, the second value is less than or equal to the third value. The third value is a base value used by the network device to determine the second value.

Further, each of the first value, the second value and the third value has a value range of 0 to 1; or each of the first value, the second value and the third value has the value range of 0 to 10.

In other words, supposing that the first value is k, the second value is n, the first uplink carrier is a secondary uplink carrier, and the second uplink carrier is a primary uplink carrier, in an embodiment of the present disclosure, the principle for the network device to determine the second value may be any one of the following principles.

If the load of the primary uplink carrier is lighter than that of the secondary uplink carrier, the network device configures a number less than 0.5 (5) such as 0.3 (3) for the terminal device. If the load of the primary uplink carrier is heavy, the network device configures a number greater than 0.5 (5) such as 0.7 (7) for the terminal device.

If the load of the primary uplink carrier is light, the network device configures a number greater than 0.5 (5) such as 0.7 (7) for the terminal device. If the load of the primary uplink carrier is heavy, the network device configures a number less than 0.5 (5) such as 0.3 (3) for the terminal device.

Thus, after the terminal device obtains the first value and the second value discussed above, it can determine the target uplink carrier by comparing the sizes of the first value and the second value. For example, when the comparison result is that the first value is greater than the second value, the comparison result indicates that the target uplink carrier is the first uplink carrier; or when the comparison result is that the first value is less than or equal to the second value, the comparison result indicates that the target uplink carrier is the second uplink carrier.

In other words, supposing that the first value is k, the second value is n, the first uplink carrier is the secondary uplink carrier, and the second uplink carrier is the primary uplink carrier, in an embodiment of the present disclosure, the principle for the terminal device to select the target uplink carrier may be any one of the following principles:

If n is greater than k, the primary uplink carrier is selected, otherwise the secondary uplink carrier is selected.

If n is greater than k, the secondary uplink carrier is selected, otherwise the primary uplink carrier is selected.

It should be understood that the combination of the network device determining the second value and the terminal device determining the target uplink carrier according to the first value and the second value is not specifically limited in the embodiment of the present disclosure. That is, in the embodiment of the present disclosure, the principle that the network device determines the second value and the principle that the terminal device determines the target uplink carrier may be bound or not bound, which is not limited in the embodiment of the present disclosure.

Figure 3:
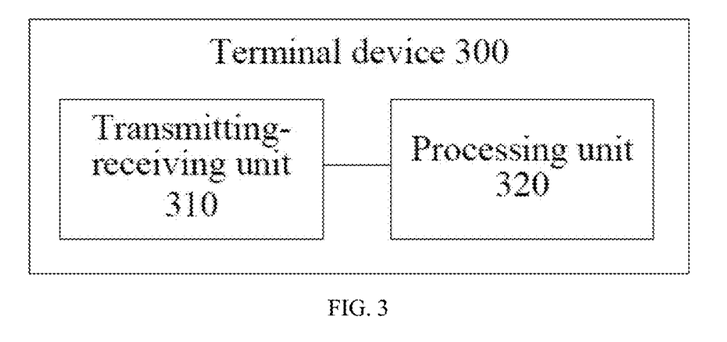
FIG. 3 is a schematic block diagram of a terminal device according to an embodiment of the present disclosure.

FIG. 3 is a schematic block diagram of a terminal device according to an embodiment of the present disclosure.

Specifically, as shown in FIG. 3, the terminal device 300 includes:

a transmitting-receiving unit 310, configured to receive a first value broadcast by a network device, the first value being configured for the terminal device to select a carrier; and a processing unit 320, configured to determine a target uplink carrier from a first uplink carrier and a second uplink carrier according to the first value, the first uplink carrier and the second uplink carrier being configured for the terminal device to transmit data and having different frequencies.

The transmitting-receiving unit 310 is further configured to send uplink data to the network device over the target uplink carrier.

Optionally, the processing unit 320 or the transmitting-receiving unit 310 is further configured to obtain a second value before the processing unit 320 determines the target uplink carrier. The second value is configured to be compared with the first value, and a comparison result between the first value and the second value indicates that the target uplink carrier is the first uplink carrier or the second uplink carrier. The processing unit is configured to determine the target uplink carrier according to the comparison result.

Optionally, the processing unit 320 is configured to randomly generate the second value.

Optionally, the transmitting-receiving unit 310 is configured to receive the second value sent by the network device. The second value is determined by the network device according to a load condition of the first uplink carrier and the load condition of the second uplink carrier.

Optionally, if a load of the first uplink carrier is less than the load of the second uplink carrier, the second value is greater than a third value; and if the load of the first uplink carrier is greater than or equal to the load of the second uplink carrier, the second value is less than or equal to the third value. The third value is a base value used by the network device to determine the second value.

Optionally, if a load of the first uplink carrier is greater than or equal to the load of the second uplink carrier, the second value is greater than a third value; and if the load of the first uplink carrier is less than the load of the second uplink carrier, the second value is less than or equal to the third value. The third value is a base value used by the network device to determine the second value.

Optionally, when the comparison result is that the first value is greater than the second value, the comparison result indicates that the target uplink carrier is the first uplink carrier; or when the comparison result is that the first value is less than or equal to the second value, the comparison result indicates that the target uplink carrier is the second uplink carrier.

Optionally, each of the first value, the second value and the third value has a value range of 0 to 1; or each of the first value, the second value and the third value has the value range of 0 to 10.

Optionally, a signal measurement quality of the terminal device is greater than a threshold value broadcast by a system.

Figure 4:
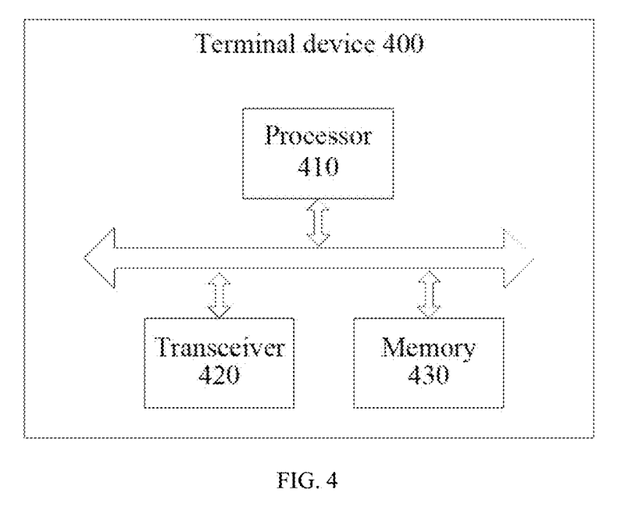
FIG. 4 is a schematic block diagram of another terminal device according to an embodiment of the present disclosure.

In an embodiment of the present disclosure, the transmitting-receiving unit 310 may be a transceiver, and the processing unit 320 may be a processor. As shown in FIG. 4, the terminal device 400 may include a processor 410, a transceiver 420, and a memory 430. The memory 430 may be used to store information, and may also be used to store codes, instructions and the like executed by the processor 410. Various components in the terminal device 400 are coupled through a bus system. The bus system includes a power bus, a control bus, and a status signal bus in addition to a data bus. It should be understood that the terminal device 400 shown in FIG. 4 can implement various processes implemented by the terminal device in the above method embodiments shown in FIG. 2.

Figure 5:
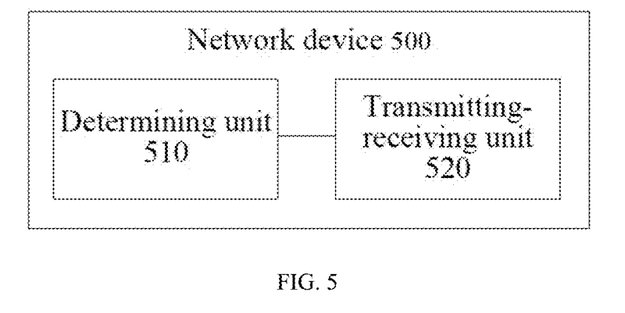
FIG. 5 is a schematic block diagram of a network device according to an embodiment of the present disclosure.

FIG. 5 is a schematic block diagram of a network device according to an embodiment of the present disclosure.

Specifically, as shown in FIG. 5, the network device 500 includes:

a determining unit 510, configured to determine a first value, the first value being configured for a terminal device to determine a target uplink carrier from a first uplink carrier and a second uplink carrier, and the first uplink carrier and the second uplink carrier being configured for the terminal device to transmit data and having different frequencies; and a transmitting-receiving unit 520, configured to send the first value to the terminal device in a broadcast manner.

Optionally, the determining unit 510 is further configured to determine a second value according to a load condition of the first uplink carrier and the load condition of the second uplink carrier, so that the terminal device determines the target uplink carrier from the first uplink carrier and the second uplink carrier by comparing the first value and the second value.

The transmitting-receiving unit 520 is further configured to send the second value to the terminal device.

Optionally, if a load of the first uplink carrier is less than the load of the second uplink carrier, the second value is greater than a third value; and if the load of the first uplink carrier is greater than or equal to the load of the second uplink carrier, the second value is less than or equal to the third value. The third value is a base value used by the network device to determine the second value.

Optionally, if a load of the first uplink carrier is greater than or equal to the load of the second uplink carrier, the second value is greater than a third value; and if the load of the first uplink carrier is less than the load of the second uplink carrier, the second value is less than or equal to the third value. The third value is a base value used by the network device to determine the second value.

Optionally, each of the first value, the second value and the third value has a value range of 0 to 1; or each of the first value, the second value and the third value has the value range of 0 to 10.

Optionally, a signal measurement quality of the terminal device is greater than a threshold value broadcast by a system.

Figure 6:
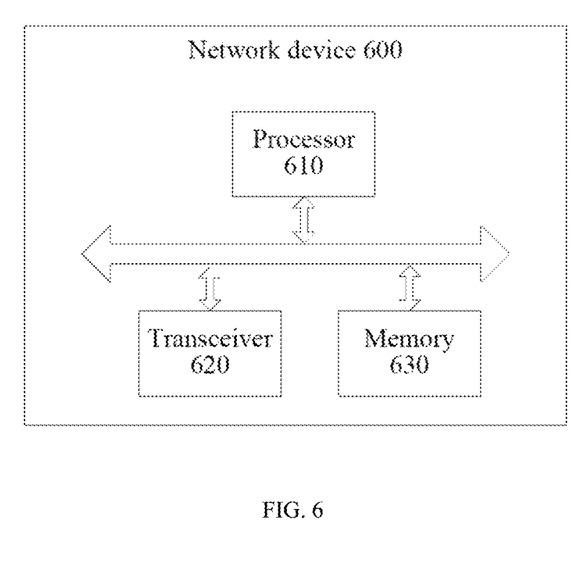
FIG. 6 is a schematic block diagram of another network device according to an embodiment of the present disclosure.

In an embodiment of the present disclosure, the determining unit 510 may be a processor, and the transmitting-receiving unit 520 may be a transceiver. As shown in FIG. 6, the network device 600 may include a processor 510, a transceiver 620, and a memory 630. The memory 630 may be used to store information, and may also be used to store codes, instructions and the like executed by the processor 610. Various components in the network device 600 are coupled through a bus system. The bus system includes a power bus, a control bus, and a status signal bus in addition to a data bus.

The network device 600 shown in FIG. 6 can implement various processes implemented by the network device in the above method embodiments shown in FIG. 2, which is not described herein to avoid repetition. That is, the method embodiments among the embodiments of the present disclosure may be applied in a processor, or implemented by the processor.

In the implementation, various steps of the method embodiment of the embodiments of the present disclosure may be completed by an integrated logic circuit as hardware or an instruction in a software form in a processor. More specifically, the steps of the method disclosed in combination with the embodiments of the present disclosure may be directly implemented by a hardware decoding processor, or may be implemented by a combination of hardware and a software module in a decoding processor. The software module may be located in a storage medium such as a random access memory, a flash memory, a read-only memory, a programmable read-only memory, or an electrically erasable and programmable memory, a register, and the like. The storage medium is located in a memory, and the processor reads information in the memory and implements the steps of the foregoing method in combination with the hardware thereof.

It should be understood that the processor mentioned in the embodiments of the present disclosure may be an integrated circuit chip with a signal processing capability, and may implement or execute the methods, steps, and logic block diagrams disclosed in the embodiments of the present disclosure. For example, the aforementioned processor may be a general-purpose processor, a digital signal processor (DSP), an application specific integrated circuit (ASIC), a field programmable gate array (FPGA), or other programmable logic device, transistor logic device, discrete hardware component, and the like. In addition, the general-purpose processor may be a microprocessor or the processor may be any conventional processor or the like.

In addition, the memory mentioned in the embodiment of the present disclosure may be a volatile memory or a non-volatile memory, or may include both volatile and non-volatile memories. Among them, the non-volatile memory may be a read-only memory (ROM), a programmable read-only memory (PROM), an erasable and programmable read-only memory (erasable PROM, EPROM), an electrically erasable and programmable read-only memory (electrically EPROM, EEPROM) or flash memory. The volatile memory may be a random access memory (RAM), which is used as an external cache. It should be understood that the foregoing memory is exemplary but not restrictive. For example, the memory in the embodiment of the present disclosure may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous connection dynamic random access memory (synch link DRAM, SLDRAM) and direct memory bus random access memory (Direct Rambus RAM, DR RAM), etc. That is, the memory of the systems and methods described herein is intended to include, but is not limited to, these and any other suitable types of memories.

It should be noted that the terminology used in the embodiments of the present disclosure and the appended claims is for the purpose of describing particular embodiments only and is not intended to limit the embodiments of the present disclosure.

For example, the singular forms "a/an", "said", "the above", and "the" used in the embodiments of the present disclosure and the appended claims are also intended to include plural forms unless the context clearly indicates otherwise.

As another example, in the embodiments of the present disclosure, terms "first type cell group" and "second type cell group" may be used, but these type cell groups should not be limited to these terms. These terms are only used to distinguish the type cell groups from each other.

As another example, depending on the context, the term "when" as used herein can be interpreted as "if" or "in a case where" or "at the time of" or "in response to determining" or "in response to detecting". Similarly, depending on the context, the phrase "if it is determined" or "if it is detected (a condition or event stated)" can be interpreted as "when it is determined" or "in response to determining" or "when it is detected (a condition or event stated)" or "in response to detecting (a condition or event stated)".

Those of ordinary skill in the art may realize that units and algorithm steps of various examples described in connection with the embodiments disclosed herein can be implemented by electronic hardware, or a combination of computer software and electronic hardware. Whether these functions are performed in hardware or software depends on a specific application and a design constraint of the technical solution. Professional technicians can use different methods to implement the described functions for each specific application, but such implementation should not be considered to be beyond the scope of the embodiments of the present disclosure.

Those skilled in the art can clearly understand that for the convenience and brief description, specific working processes of the systems, devices, and units described above can refer to corresponding processes in the foregoing method embodiments, and are not repeated herein.

In several embodiments provided in the application, it should be understood that the disclosed systems, devices, and methods may be implemented in other ways. For example, the device embodiments described above are only schematic. For example, the division of units is only a logical function division. In actual implementation, there may be another division manner. For example, multiple units or components may be combined or integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

Units described as separate components may be or may not be physically separated, and components shown as units may be or may not be physical units, which may be located in one place, or may be distributed on multiple network units. Some or all of the units may be selected according to actual needs to achieve the object of the embodiments of the present disclosure.

In addition, various functional units in the embodiments of the present disclosure may be integrated into one processing unit, or each unit may physically exist separately, or two or more units may be integrated into one unit.

If it is implemented in the form of a software functional unit and sold or used as an independent product, it may be stored in a computer-readable storage medium. Based on such understanding, the part or the part of the technical solution, that the essence of the technical solution of the embodiments of the present disclosure is or that contributes to the prior art, may be embodied in the form of a software product, which is stored in a storage medium. The storage medium includes a plurality of instructions, so that a computer device (which may be a personal computer, a server, or a network device, etc.) may perform all or part of the steps of the method described in the embodiments of the present disclosure. The foregoing storage medium includes various media that can store program codes, such as a U disk, a mobile hard disk, a read-only memory, a random access memory, a magnetic disk, or an optical disk.

The above are only specific implementations of the embodiments of the present disclosure, and the protection scope of the embodiments of the present disclosure is not limited thereto. Any person skilled in the art can easily conceive of modifications and substitutes within the technical scope disclosed by the embodiments of the present disclosure. Such modifications and substitutes are within the protection scope of the embodiments of the present disclosure. Therefore, the protection scope of the embodiments of the present disclosure shall be subject to the protection scope of the claims.

What is claimed is:

1. A method for transmitting information, comprising:
    receiving, by a terminal device, a first value broadcast by a network device, the first value being configured for the terminal device to select a carrier;
    selecting, by the terminal device, a target uplink carrier from a first uplink carrier and a second uplink carrier according to the first value, the first uplink carrier and the second uplink carrier being configured for the terminal device to transmit data and having different frequencies from each other; and
    sending, by the terminal device, uplink data to the network device over the target uplink carrier,
    wherein the method further comprises:
    obtaining, by the terminal device, a second value, the second value being configured to be compared with the first value, and a comparison result between the first value and the second value indicating that the target uplink carrier is one of the first uplink carrier and the second uplink carrier,
    wherein the target uplink carrier is selected according to the comparison result,
    wherein obtaining, by the terminal device, a second value comprises:
    receiving, by the terminal device, the second value sent by the network device, wherein the second value is determined by the network device according to a load condition of the first uplink carrier and the load condition of the second uplink carrier,
    wherein when a load of the first uplink carrier is less than the load of the second uplink carrier, the second value is greater than a third value; and when the load of the first uplink carrier is greater than or equal to the load of the second uplink carrier, the second value is less than or equal to the third value,
    wherein the third value is a base value used by the network device to determine the second value.

2. The method according to claim 1, wherein when the comparison result is that the first value is greater than the second value, the comparison result indicates that the target uplink carrier is the first uplink carrier; and
    when the comparison result is that the first value is less than or equal to the second value, the comparison result indicates that the target uplink carrier is the second uplink carrier.

3. The method according to claim 1, wherein each of the first value, the second value and the third value has a value range of 0 to 1.

4. The method according to claim 1, wherein a signal measurement quality of the terminal device is greater than a threshold value broadcast by a system.

5. The method according to claim 1, wherein each of the first value, the second value and the third value has a value range of 0 to 10.

6. A method for transmitting information, comprising:
determining, by a network device, a first value, the first value being configured for a terminal device to determine a target uplink carrier from a first uplink carrier and a second uplink carrier, and the first uplink carrier and the second uplink carrier being configured for the terminal device to transmit data and having different frequencies; and
sending, by the network device, the first value to the terminal device in a broadcast manner;
wherein the method further comprises:
determining, by the network device, a second value according to a load condition of the first uplink carrier and the load condition of the second uplink carrier, so that the terminal device determines the target uplink carrier from the first uplink carrier and the second uplink carrier by comparing the first value and the second value; and
sending, by the network device, the second value to the terminal device,
wherein when a load of the first uplink carrier is less than the load of the second uplink carrier, the second value is greater than a third value; and when the load of the first uplink carrier is greater than or equal to the load of the second uplink carrier, the second value is less than or equal to the third value,
wherein the third value is a base value used by the network device to determine the second value.

7. The method according to claim 6, wherein each of the first value, the second value and the third value has a value range of 0 to 1.

8. The method according to claim 6, wherein a signal measurement quality of the terminal device is greater than a threshold value broadcast by a system.

9. The method according to claim 6, wherein each of the first value, the second value and the third value has a value range of 0 to 10.

10. A terminal device, comprising:
a transceiver, configured to receive a first value broadcast by a network device, the first value being configured for the terminal device to select a carrier; and
a processor, configured to determine a target uplink carrier from a first uplink carrier and a second uplink carrier according to the first value, the first uplink carrier and the second uplink carrier being configured for the terminal device to transmit data and having different frequencies,
wherein the transceiver is further configured to send uplink data to the network device over the target uplink carrier,
wherein one of the processor and the transceiver is further configured to:
obtain a second value before the processor determines the target uplink carrier, the second value being configured to be compared with the first value, and a comparison result between the first value and the second value indicating that the target uplink carrier is one of the first uplink carrier and the second uplink carrier,
wherein the processor is configured to:
determine the target uplink carrier according to the comparison result,
wherein obtaining the second value comprises:
receiving the second value sent by the network device, wherein the second value is determined by the network device according to a load condition of the first uplink carrier and the load condition of the second uplink carrier,
wherein when a load of the first uplink carrier is less than the load of the second uplink carrier, the second value is greater than a third value; and when the load of the first uplink carrier is greater than or equal to the load of the second uplink carrier, the second value is less than or equal to the third value,
wherein the third value is a base value used by the network device to determine the second value.

* * * * *